United States Patent Office 3,846,111
Patented Nov. 5, 1974

3,846,111
ORGANIC FERTILIZER FOR PLANTS
Carlos Molini Mejia, Ext. Alhambra A-B 9,
Ponce, Puerto Rico
No Drawing. Filed Dec. 1, 1972, Ser. No. 311,269
Int. Cl. C05c 9/00
U.S. Cl. 71—28                                    1 Claim

ABSTRACT OF THE DISCLOSURE

The invention is a fertilizer having as its main ingredients low biuret urea, acetone, a vegetable oil and water in amounts specified hereinafter.

The Invention

The present invention relates to an organic fertilizer for plants and trees and the method of preparing the same.

There are many advantages derived from the use of the fertilizer. The materials are relatively inexpensive thereby reducing the cost of fertilizing the plants and trees. There are no toxic residues which would inhibit future growth. Other advantages will be apparent from use of the material.

The fertilizer comprises a mixture of the following amounts of ingredients:

6 ounces of Low Biuret Urea
3 ounces of Vegetable Oil
6 ounces of Acetone
5 gallons of Water The fertilizer is prepared by mixing the low biuret urea, the vegetable oil and the acetone in a blender. The mixture is then stirred for sufficient time to produce a white emulsion. In use as a fertilizer, the emulsion is mixed with water and spread around the plants or trees.

I claim:
1. An organic fertilizer composition comprising a mixture of the following ingredients in the specified proportions:
6 ounces of Low Biuret Urea
3 ounces of Vegetable Oil
6 ounces of Acetone
5 gallons of Water

References Cited
UNITED STATES PATENTS
3,663,198   5/1972   Backlund _____ 71—1 X CHARLES N. HART, Primary Examiner
R. BARNES, Assistant Examiner U.S. Cl. X.R.
71—64 C